United States Patent
Yeh

(10) Patent No.: US 11,010,290 B2
(45) Date of Patent: May 18, 2021

(54) METHOD FOR READING MANAGEMENT INFORMATION ACCORDING TO UPDATING DATA REFLECTING BOTH OF HOST WRITE AND DATA MERGE, MEMORY STORAGE DEVICE AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 111 days.

(21) Appl. No.: 16/168,841

(22) Filed: Oct. 24, 2018

(65) Prior Publication Data

US 2020/0073792 A1 Mar. 5, 2020

(30) Foreign Application Priority Data

Aug. 28, 2018 (TW) ................................. 107130013

(51) Int. Cl.
*G06F 12/02* (2006.01)
*G06F 3/06* (2006.01)
*G06F 7/32* (2006.01)

(52) U.S. Cl.
CPC ........ *G06F 12/0246* (2013.01); *G06F 3/0619* (2013.01); *G06F 3/0656* (2013.01); *G06F 3/0676* (2013.01); *G06F 7/32* (2013.01); *G06F 2212/7201* (2013.01); *G06F 2212/7203* (2013.01)

(58) Field of Classification Search
CPC ......... G06F 12/0246; G06F 2212/7201; G06F 2212/7203; G06F 3/0619; G06F 3/0656; G06F 3/0676; G06F 7/32
See application file for complete search history.

(56) References Cited

U.S. PATENT DOCUMENTS

| 8,316,176 | B1 | 11/2012 | Phan et al. | |
| 2014/0325117 | A1 | 10/2014 | Canepa et al. | |
| 2017/0038977 | A1* | 2/2017 | Yeh | G06F 3/0608 |
| 2017/0039141 | A1* | 2/2017 | Yeh | G06F 3/0679 |

\* cited by examiner

*Primary Examiner* — Jane Wei
(74) *Attorney, Agent, or Firm* — JCIPRNET

(57) ABSTRACT

Exemplary embodiments of the disclosure provide a memory management method for a rewritable non-volatile memory module including the following steps. A host write operation is performed to receive a write command from a host system and store a first data corresponding to the write command to a first physical unit. A first updating data corresponding to the host write operation is recorded. A data merge operation is performed to read a second data from a second physical unit and store the second data to a third physical unit. A second updating data corresponding to the data merge operation is recorded. A management information is read from the rewritable non-volatile memory module to a buffer memory and updated in the buffer memory according to the first updating data and the second updating data.

27 Claims, 9 Drawing Sheets

METHOD FOR READING MANAGEMENT INFORMATION ACCORDING TO UPDATING DATA REFLECTING BOTH OF HOST WRITE AND DATA MERGE, MEMORY STORAGE DEVICE AND MEMORY CONTROL CIRCUIT UNIT

CROSS-REFERENCE TO RELATED APPLICATION

This application claims the priority benefit of Taiwan application serial no. 107130013, filed on Aug. 28, 2018. The entirety of the above-mentioned patent application is hereby incorporated by reference herein and made a part of this specification.

BACKGROUND

Technical Field

The disclosure relates to a memory management technology, and more particularly to a memory management method, a memory storage device, and a memory control circuit unit.

Description of Related Art

Digital cameras, mobile phones, and MP3 players have been growing very quickly in recent years, causing consumer demand for storage media to increase rapidly. Since a rewritable non-volatile memory module (e.g. a flash memory) has characteristics such as data non-volatile, power saving, small size, no mechanical structure, etc., the rewritable non-volatile memory module is very suitable to be built in the various portable multimedia devices exemplified above.

When the number of spare physical units of a memory storage device is insufficient, a garbage collection procedure is normally used to collect the stored valid data and release new spare physical units. When the garbage collection procedure is performed, management information such as a logical-to-physical mapping table stored in the rewritable non-volatile memory module may be frequently accessed and modified. In addition, when a host write operation is performed to store data from a host system, management information such as the logical-to-physical mapping table stored in the rewritable non-volatile memory module may also be frequently accessed and modified, thereby accelerating the wear of the rewritable non-volatile memory module (e.g. the write amplification of data may be increased).

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a memory management method, a memory storage device, and a memory management circuit, which may effectively reduce the number of accesses to a rewritable non-volatile memory module.

Exemplary embodiments of the disclosure provide a memory management method for the rewritable non-volatile memory module which includes multiple physical units. The memory management method includes the following steps. A host write operation is performed to receive a write command from a host system and store first data corresponding to the write command to a first physical unit among the physical units. First updating data corresponding to the host write operation is recorded. A data merge operation is performed to read second data from a second physical unit among the physical units and store the second data to a third physical unit among the physical units. Second updating data corresponding to the data merge operation is recorded. Management information is read from the rewritable non-volatile memory module to a buffer memory and the management information is updated in the buffer memory according to the first updating data and the second updating data.

Exemplary embodiments of the disclosure further provide a memory storage device including a connection interface unit, a rewritable non-volatile memory module, and a memory control circuit unit. The connection interface unit is configured to be coupled to a host system. The rewritable non-volatile memory module includes multiple physical units. The memory control circuit unit is coupled to the connection interface unit and the rewritable non-volatile memory module. The memory control circuit unit is configured to perform a host write operation to receive a write command from the host system and instruct a storing of first data corresponding to the write command to a first physical unit among the physical units. The memory control circuit unit is further configured to record first updating data corresponding to the host write operation. The memory control circuit unit is further configured to perform a data merge operation to instruct a reading of second data from a second physical unit among the physical units and a storing of the second data to a third physical unit among the physical units. The memory control circuit unit is further configured to record second updating data corresponding to the data merge operation. The memory control circuit unit is further configured to instruct a reading of management information from the rewritable non-volatile memory module to a buffer memory and update the management information in the buffer memory according to the first updating data and the second updating data.

Exemplary embodiments of the disclosure further provide a memory control circuit unit for controlling a rewritable non-volatile memory module. The rewritable non-volatile memory module includes multiple physical units. The memory control circuit unit includes a host interface, a memory interface, a buffer memory, and a memory management circuit. The host interface is configured to be coupled to a host system. The memory interface is configured to be coupled to the rewritable non-volatile memory module. The memory management circuit is coupled to the host interface, the memory interface, and the buffer memory. The memory management circuit is configured to perform a host write operation to receive a write command from the host system and instruct a storing of first data corresponding to the write command to a first physical unit among the physical units. The memory management circuit is further configured to record first updating data corresponding to the host write operation. The memory management circuit is further configured to perform a data merge operation to instruct a reading of second data from a second physical unit among the physical units and a storing of the second data to a third physical unit among the physical units. The memory management circuit is further configured to record second updating data corresponding to the data merge operation. The memory management circuit is further configured to instruct a reading of management information from the rewritable non-volatile memory module to the buffer memory and update the management information in the buffer memory according to the first updating data and the second updating data.

Exemplary embodiments of the disclosure further provide a memory storage device including a connection interface unit, a rewritable non-volatile memory module, and a memory control circuit unit. The connection interface unit is configured to be coupled to a host system. The rewritable non-volatile memory module includes multiple physical units. The memory control circuit unit is coupled to the connection interface unit and the rewritable non-volatile memory module. The memory control circuit unit is configured to perform a first write operation. The first write operation includes one of an operation of storing first data received from the host system to a first physical unit among the physical units and an operation of writing a second data stored in a second physical unit among the physical units to a third physical unit among the physical units. The memory control circuit unit is further configured to record first updating data corresponding to the first write operation. The memory control circuit unit is further configured to determine whether second updating data exists. The second updating data is generated based on a second write operation. The second write operation includes the other operation of the operation of storing the first data to the first physical unit and the operation of writing the second data to the third physical unit. The memory control circuit unit is further configured to instruct a reading of management information from the rewritable non-volatile memory module to a buffer memory and update the management information in the buffer memory according to the first updating data and the second updating data.

Based on the above, the first updating data and the second updating data respectively corresponding to the performed host write operation and the performed data merge operation may be recorded. After a specific time point, the management information may be read from the rewritable non-volatile memory module to the buffer memory and updated in the buffer memory according to the first updating data and the second updating data. As such, the number of accesses to the rewritable non-volatile memory module may be effectively reduced, thereby extending the life span of the rewritable non-volatile memory module.

To make the aforementioned and other features of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and may be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
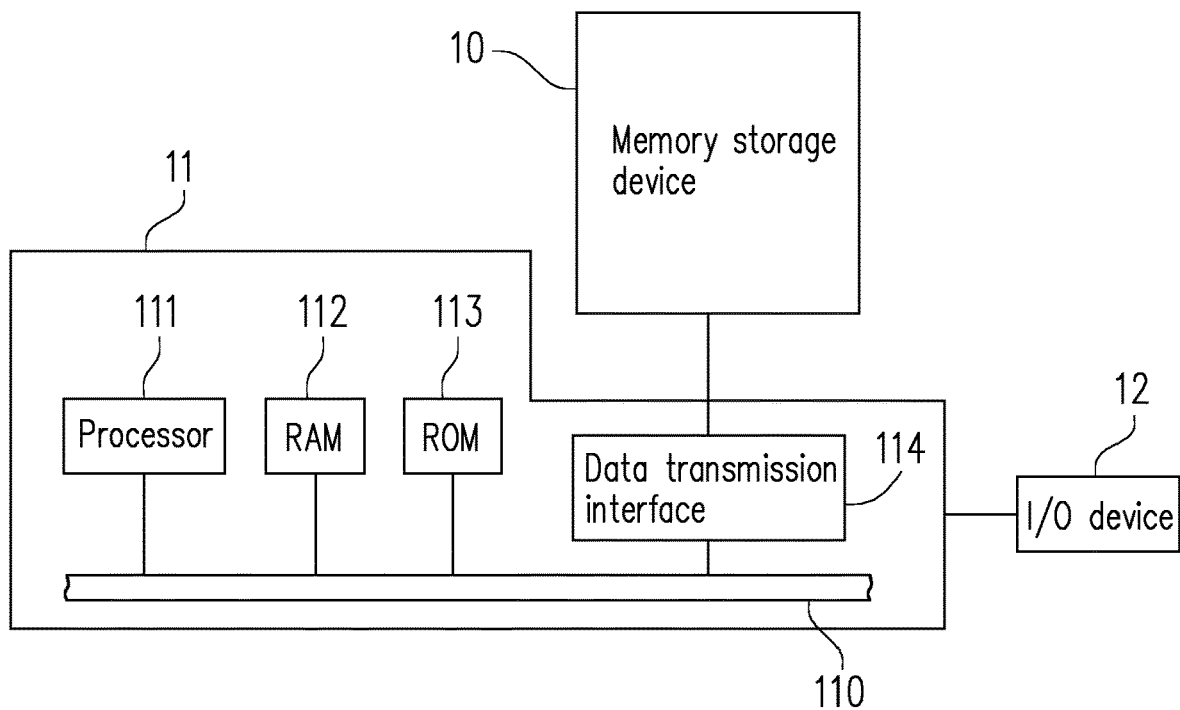
FIG. 1 is a schematic diagram of a host system, a memory storage device, and an input/output (I/O) device according to an exemplary embodiment of the disclosure.

Reference may now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" may be used interchangeably herein.

Generally, a memory storage device (also referred to as a memory storage system) includes a rewritable non-volatile memory module and a controller (also referred to as a control circuit). The memory storage device is normally used together with a host system, allowing the host system to write data to the memory storage device or read data from the memory storage device.

Figure 2:
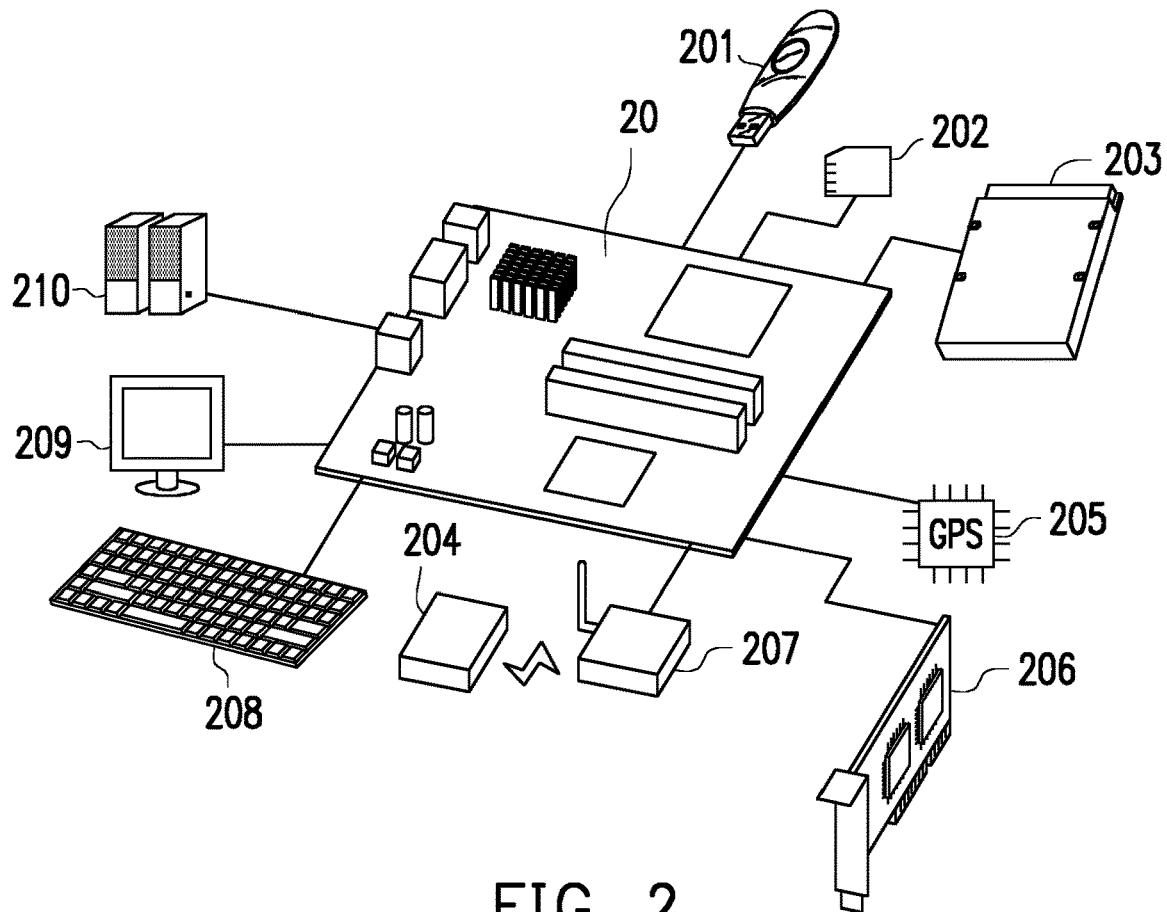
FIG. 2 is a schematic diagram of a host system, a memory storage device, and an I/O device according to another exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to another exemplary embodiment of the disclosure.

Please refer to FIG. 1 and FIG. 2, a host system 11 normally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In the exemplary embodiment, the host system 11 is coupled to a memory storage device 10 through the data transmission interface 114. For example, the host system 11 may store data to the memory storage device 10 or read data from the memory storage device 10 via the data transmission interface 114. In addition, the host system 11 is coupled to an I/O device 12 through the system bus 110. For example, the host system 11 may transmit an output signal to the I/O device 12 or receive an input signal from the I/O device 12 via the system bus 110.

In the exemplary embodiment, the processor 111, the random access memory 112, the read-only memory 113, and the data transmission interface 114 may be disposed on a motherboard 20 of the host system 11. The number of data transmission interfaces 114 may be one or more. The motherboard 20 may be coupled to the memory storage device 10 via a wired or a wireless method through the data transmission interface 114. The memory storage device 10 may be, for example, a flash drive 201, a memory card 202, a Solid State Drive (SSD) 203, or a wireless memory storage device 204. The wireless memory storage device 204 may be, for example, a Near Field Communication (NFC) memory storage device, a wireless fidelity (WiFi) memory storage device, a Bluetooth memory storage device, a Bluetooth low energy (BLE) memory storage device (e.g. iBeacon), or other memory storage devices based on various types of wireless communication technologies. In addition, the motherboard 20 may also be coupled to a Global Positioning System (GPS) module 205, a network interface card 206, a wireless transmission device 207, a keyboard 208, a screen 209, a speaker 210, or other types of I/O devices through the system bus 110. For example, in an exemplary embodiment, the motherboard 20 may access the wireless memory storage device 204 through the wireless transmission device 207.

Figure 3:
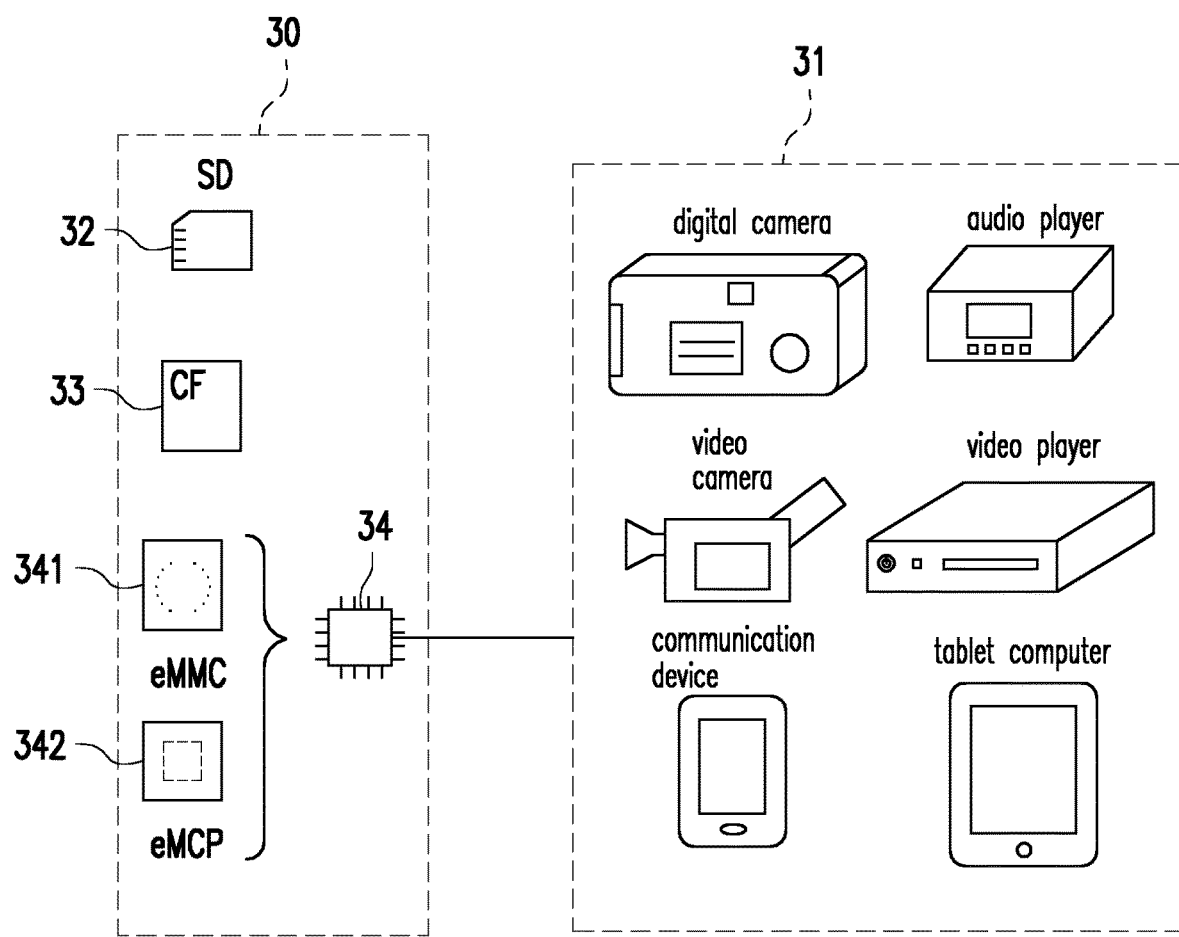
FIG. 3 is a schematic diagram of a host system and a memory storage device according to another exemplary embodiment of the disclosure.

In an exemplary embodiment, the host system mentioned may be any system that may substantially work with a memory storage device to store data. Although in the exemplary embodiments above, a computer system is used as the host system for illustration, FIG. 3 is a schematic diagram of a host system and a memory storage device according to another exemplary embodiment of the disclosure. Please refer to FIG. 3, in another exemplary embodiment, a host system 31 may also be a digital camera, a video camera, a communication device, an audio player, a video player, a tablet computer, or other systems. A memory storage device 30 may be a Secure Digital (SD) card 32, a Compact Flash (CF) card 33, an embedded storage device 34, or other types of non-volatile memory storage devices used by the host system 31. The embedded storage device 34 includes an embedded Multi Media Card (eMMC) 341, and/or an embedded Multi Chip Package (eMCP) storage device 342, or various types of embedded storage devices which directly couple a memory module onto a substrate of a host system.

Figure 4:
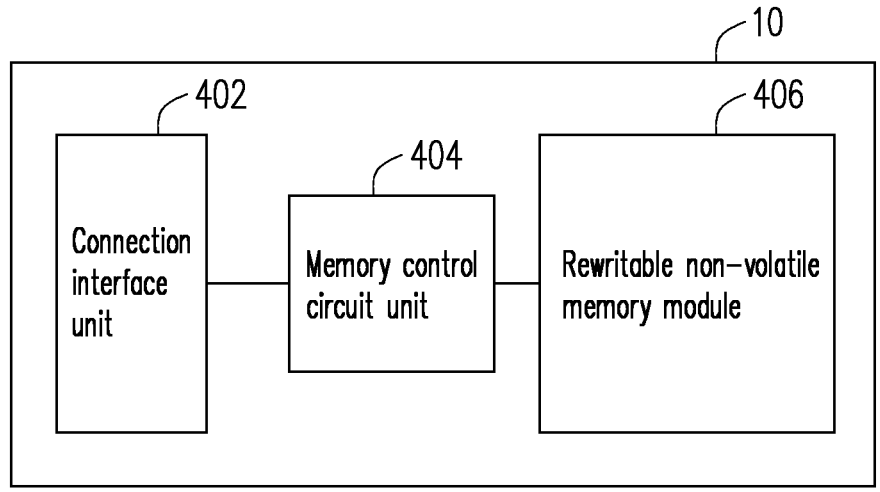
FIG. 4 is a functional block diagram of a memory storage device according to an exemplary embodiment of the disclosure.

FIG. 4 is a functional block diagram of a memory storage device according to an exemplary embodiment of the disclosure. Please refer to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. In the exemplary embodiment, the connection interface unit 402 is compatible with the Serial Advanced Technology Attachment (SATA) standard. However, it must be understood that the disclosure is not limited thereto. The connection interface unit 402 may also be compatible with the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the SD interface standard, the Ultra High Speed-I (UHS-I) interface standard, the Ultra High Speed II (UHS-II) interface standard, the Memory Stick (MS) interface standard, the MCP interface standard, the MMC interface standard, the eMMC interface standard, the Universal Flash Storage (UFS) interface standard, the eMCP interface standard, the CF interface standard, the Integrated Device Electronics (IDE) standard, or other suitable standards. The connection interface unit 402 may be packaged in one chip with the memory control circuit unit 404 or the connection interface unit 402 may be disposed outside a chip containing the memory control circuit unit 404.

The memory control circuit unit 404 is configured to perform multiple logic gates or control commands implemented using a hardware type or a firmware type and execute operations such as writing, reading, and erasing of data in the rewritable non-volatile memory module 406 according to the command of the host system 11.

The rewritable non-volatile memory module 406 is coupled to the memory control circuit unit 404 and is configured to store data written by the host system 11. The rewritable non-volatile memory module 406 may be a Single Level Cell (SLC) NAND flash memory module (i.e., a flash memory module which stores 1-bit in one memory cell), a Multi Level Cell (MLC) NAND flash memory module (i.e., a flash memory module which stores 2-bits in one memory cell), a Triple Level Cell (TLC) NAND flash memory module (i.e., a flash memory module which stores 3-bits in one memory cell), other flash memory modules, or other memory modules with the same characteristic.

Each memory cell of the rewritable non-volatile memory modules 406 stores one or more bits based on a change of voltage (also referred to as a threshold voltage hereinafter). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data into the memory cell" or "programming the memory cell". As the threshold voltage changes, each memory cell of the rewritable non-volatile memory module 406 has multiple storage states. Through applying a read voltage, the storage state to which a memory cell belongs may be determined, thereby obtaining one or more bits stored by the memory cell.

In the exemplary embodiment, the memory cells of the rewritable non-volatile memory module 406 constitute multiple physical programming units, and the physical programming units constitute multiple physical erasing units. Specifically, the memory cells on the same word line form one or more physical programming units. If each memory cell may store two bits or more than 2 bits, then the physical programming units on the same word line may at least be classified into a lower physical programming unit and an upper physical programming unit. For example, a Least Significant Bit (LSB) of a memory cell belongs to the lower physical programming unit while a Most Significant Bit (MSB) of a memory cell belongs to the upper physical programming unit. Generally, in an MLC NAND flash memory, the write speed of the lower physical programming unit is greater than the write speed of the upper physical programming unit, and/or the reliability of the lower physical programming unit is higher than the reliability of the upper physical programming unit.

In the exemplary embodiment, the physical programming unit is the smallest unit of programming. That is, the physical programming unit is the smallest unit of write data. For example, the physical programming unit is a physical page or a physical sector. If the physical programming unit is a physical page, then the physical programming units normally include a data bit region and a redundancy bit region. The data bit region includes multiple physical sectors for storing user data while the redundancy bit region is for storing system data (e.g. management data such as error correction codes, etc.). In the exemplary embodiment, the data bit region contains 32 physical sectors, and the size of one physical sector is 512 bytes (B). However, in other exemplary embodiments, a data bit region may also contain 8, 16, a higher number, or a lower number of physical sectors, and the size of each physical sector may also be larger or smaller. On the other hand, the physical erasing unit is the smallest unit of erase. That is, each physical erasing unit includes the smallest number of memory cells erased together. For example, the physical erasing unit is a physical block.

Figure 5:
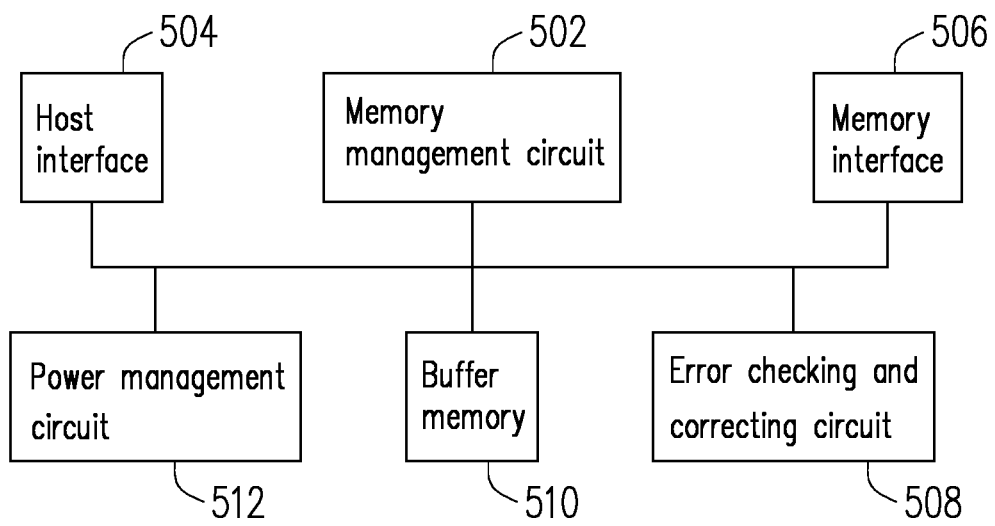
FIG. 5 is a functional block diagram of a memory control circuit unit according to an exemplary embodiment of the disclosure.

FIG. 5 is a functional block diagram of a memory control circuit unit according to an exemplary embodiment of the disclosure. Please refer to FIG. 5, the memory control circuit unit 404 includes a memory management circuit 502, a host interface 504, and a memory interface 506.

The memory management circuit 502 is configured to control the overall operation of the memory control circuit unit 404. Specifically, the memory management circuit 502 has multiple control commands. When the memory storage device 10 operates, the control commands are performed to carry out operations such as writing, reading, and erasing of data. The illustration of operation of the memory management circuit 502 below may be equivalent to the illustration of operation of the memory control circuit unit 404.

In the exemplary embodiment, the control commands of the memory management circuit 502 are implemented using a firmware type. For example, the memory management circuit 502 has a microprocessor unit (not shown) and a read only memory (not shown), and the control commands are burnt into the read only memory. When the memory storage device 10 operates, the control commands are performed by the microprocessor unit to carry out operations such as writing, reading, and erasing of data.

In another exemplary embodiment, the control commands of the memory management circuit 502 may also be stored in a specific area of the rewritable non-volatile memory module 406 (e.g. a system area in the memory module dedicated to storage of system data) using a program code. In addition, the memory management circuit 502 has a microprocessor unit (not shown), a read only memory (not shown), and a random access memory (not shown). In particular, the read only memory has a boot code. When the memory control circuit unit 404 is enabled, the microprocessor unit first performs the boot code to load the control commands stored in the rewritable non-volatile memory module into the random access memory of the memory management circuit 502. Then, the microprocessor unit may run the control commands to carry out operations such as writing, reading, and erasing of data.

In addition, in another exemplary embodiment, the control commands of the memory management circuit 502 may also be implemented using a hardware type. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage memory cells of the rewritable non-volatile memory module 406 or a group thereof. The memory write circuit is configured to issue a write command sequence to the rewritable non-volatile memory module 406 to write data into the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process the data to be written to the rewritable non-volatile memory module 406 and the data read from the rewritable non-volatile memory module 406. The write command sequence, the read command sequence, and the erase command sequence may each include one or more program code or command code, and are for instructing the rewritable non-volatile memory module 406 to perform the corresponding write, read, erase, etc. operations. In an exemplary embodiment, the memory management circuit 502 may also issue other types of command sequences to the rewritable non-volatile memory module 406 to instruct performance of the corresponding operation.

The host interface 504 is coupled to the memory management circuit 502 and is configured to receive and identify commands and data transmitted by the host system 11. In other words, the commands and the data transmitted by the host system 11 are transmitted to the memory management circuit 502 through the host interface 504. In the exemplary embodiment, the host interface 504 is compatible with the SATA standard. However, it must be understood that the disclosure is not limited thereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other standards suitable for data transmission.

The memory interface 506 is coupled to the memory management circuit 502 and is configured to access the rewritable non-volatile memory module 406. In other words, the data to be written to the rewritable non-volatile memory module 406 is converted to a format acceptable to the rewritable non-volatile memory module 406 via the memory interface 506. Specifically, if the memory management circuit 502 is to access the rewritable non-volatile memory module 406, the memory interface 506 may transmit a corresponding command sequence. For example, the command sequences may include a write command sequence instructing a writing of data, a read command sequence instructing a reading of data, an erase command sequence instructing an erasing of data, and corresponding command sequences for instructing various types of memory operations (e.g. changing read voltage level, performing garbage collection operation, etc.). The command sequences are generated, for example, by the memory management circuit 502 and transmitted to the rewritable non-volatile memory module 406 through the memory interface 506. The command sequences may include one or more signals, or data on the system bus. The signals or data may include command codes or program codes. For example, in the read command sequence, information such as a read identification code, a memory address, etc. are included.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and is configured to perform error checking and correcting operations to ensure correctness of data. Specifically, when the memory management circuit 502 receives a write command from the host system 11, the error checking and correcting circuit 508 may generate an error correcting code (ECC) and/or an error detecting code (EDC) for the data corresponding to the write command. Also, the memory management circuit 502 may write the data corresponding to the write command and the corresponding error correcting code and/or error detecting code into the rewritable non-volatile memory module 406. Then, when the memory management circuit 502 reads data from the rewritable non-volatile memory module 406, the error correcting code and/or the error detecting code corresponding to the data are read simultaneously. Also, the error checking and correcting circuit 508 may perform an error checking and correcting operation to the read data based on the error correcting code and/or error detecting code.

The buffer memory 510 is coupled to the memory management circuit 502 and is configured to temporarily store data and commands from the host system 11 or data from the rewritable non-volatile memory module 406. The power management circuit 512 is coupled to the memory management circuit 502 and is configured to control the power of the memory storage device 10.

In an exemplary embodiment, the rewritable non-volatile memory module 406 of FIG. 4 is also referred to as a flash memory module, the memory control circuit unit 404 of FIG. 4 is also referred to as a flash memory controller configured to control the flash memory module, and/or the memory management circuit 502 of FIG. 5 is also referred to as a flash memory management circuit.

Figure 6:
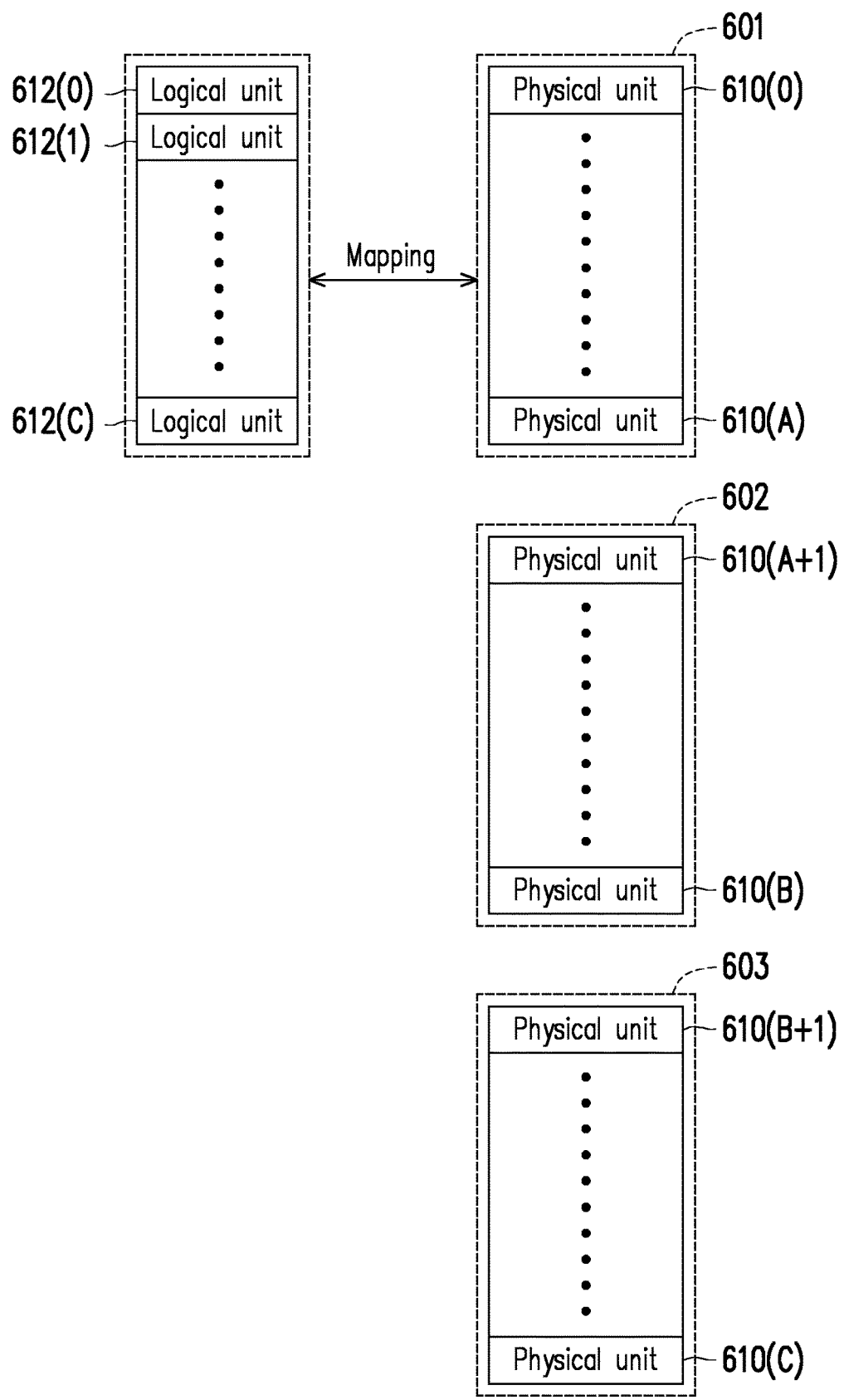
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure.

Please refer to FIG. 6, the memory management circuit 502 may logically group physical units 610(0)-610(C) of the rewritable non-volatile memory module 406 into a storage region 601, a spare region 602, and a system region 603. Physical units 610(0)-610(A) in the storage region 601 is configured to store data (e.g. user data from the host system 11 of FIG. 1). For example, the physical unit 610(0)-610(A) in the storage region 601 may store valid data and invalid data. Physical units 610(A+1)-610(B) in the spare region 602 have yet been used to store data (e.g. valid data). Physical units 610(B+1)-610(C) in the storage region 603 are configured to store management information (also referred to as system data), such as a logical-to-physical mapping table, a bad block management table, a device model, or other types of management information.

When data is to be stored, the memory management circuit 502 selects a physical unit from the physical units 610(A+1)-610(B) of the spare region 602 and stores the data from the host system 11 or from at least one physical unit of the storage region 601 into the selected physical unit. At the same time, the selected physical unit may be associated to the storage region 601. In addition, after erasing a certain physical unit in the storage region 601, the erased physical unit is re-associated to the spare region 602.

In the exemplary embodiment, each physical unit belonging to the storage region 601 is also referred to as a non-spare physical unit while each physical unit belonging to the spare region 602 is also referred to as a spare physical unit. In the exemplary embodiment, a physical unit refers to one physical erasing unit. However, in another exemplary embodiment, a physical unit may also contain multiple physical erasing units.

The memory management circuit 502 assigns logical units 612(0)-612(D) to map the physical units 610(0)-610(A) in the storage region 601. In the exemplary embodiment, each logical unit refers to a logical address. However, in another embodiment, a logical unit may also refer to a logic programming unit, a logic erasing unit, or include multiple continuous or non-continuous logical addresses. Moreover, each of the logical units 612(0)-612(D) may be mapped to one or more physical units. It shall be noted that, in an exemplary embodiment, the memory management circuit 502 may not assign logical unit mapped to the system region 603 to prevent the management information stored in the system region 603 from being modified by the user.

The memory management circuit 502 records the mapping relationship (also referred to as the logical-to-physical mapping information) between the logical units and the physical units to at least one logical-to-physical mapping table. The logical-to-physical mapping table is stored in the physical units of the system region 603. When the host system 11 reads data from the memory storage device 10 or writes data to the memory storage device 10, the memory management circuit 502 may perform a data access operation to the memory storage device 10 according to the logical-to-physical mapping table.

It is noted that in the following description, some terms may be replaced with corresponding abbreviations for ease of reading (see Table 1).

TABLE 1

| | |
|---|---|
| rewritable non-volatile memory module | RNVM module |
| memory management circuit | MMC |
| physical unit | PU |
| logical unit | LU |
| logical-to-physical mapping information | L2P information |
| logical-to-physical mapping table | L2P table |
| physical-to-logical mapping information | P2L information |

In the exemplary embodiment, valid data is the newest data belonging to a LU while invalid data is not the newest data belonging to any LU. For example, if the host system 11 stores new data to a certain LU and overwrites the old data originally stored in this LU (i.e. the data belonging to this LU is updated), then the new data stored in the storage region 601 is the newest data belonging to the LU and is marked as valid while the old data which is overwritten may still be stored in the storage region 601 but is marked as invalid.

In the exemplary embodiment, if the data belonging to a certain LU is updated, then the mapping relationship between this LU and the PU storing the old data belonging to this LU is removed, and the mapping relationship between this LU and the PU storing the newest data belonging to this LU is established. However, in another exemplary embodiment, if the data belonging to a certain LU is updated, then the mapping relationship between this LU and the PU storing the old data belonging to this LU may still be maintained.

When the memory storage device 10 is ex-factory, the total number of PUs belonging to the spare region 602 may be a preset number (e.g. 30). During the operation of the memory storage device 10, more and more PUs are selected from the spare region 602 and associated to the storage region 601 to store data (e.g. user data from the host system 11). Therefore, the total number of PUs belonging to the spare region 602 may gradually decrease with respect to the use of the memory storage device 10.

During the operation of the memory storage device 10, the MMC 502 updates the total number of PUs belonging to the spare region 602 continuously. The MMC 502 performs a data merge operation according to the number of PUs (i.e. the total number of spare PUs) in the spare region 602. For example, the MMC 502 may determine whether the total number of PUs belonging to the spare region 602 is less than or equal to a threshold value (also referred to as a first threshold value). The first threshold value is, for example, a value of 2 or more (e.g. 10), and the disclosure is not limited thereto. If the total number of PUs belonging to the spare region 602 is less than or equal to the first threshold value, the MMC 502 may perform the data merge operation. In an exemplary embodiment, the data merge operation is also referred to as a garbage collection operation.

In the data merge operation, the MMC 502 may select at least one PU (also referred to as a source node) from the storage region 601 and attempt to copy the valid data from the selected PU to another PU (also referred to as a recycling node). The PU for storing the copied valid data is selected from the spare region 602 and is associated to the storage region 601. If all the valid data stored by a certain PU has been copied to the recycling node, then the PU may be erased and associated to the spare region 602. In an exemplary embodiment, the operation of re-associating a certain PU from the storage region 601 back to the spare region 602 (or the operation of erasing a PU) is also referred to as releasing a spare PU. By performing the data merge operation, one or more spare PUs may be released, allowing the total number of PUs belonging to the spare region 602 to gradually increase.

After the data merge operation has begun, if the PUs belonging to the spare region 602 meet a specific condition, the data merge operation may be stopped. For example, the MMC 502 may determine whether the total number of PUs belonging to the spare region 602 is greater than or equal to a threshold value (also referred to as a second threshold value hereinafter). For example, the second threshold value may be greater than or equal to the first threshold value. If the total number of PUs belonging to the spare region 602 is greater than or equal to the second threshold value, the MMC 502 may stop the data merge operation. It shall be noted that stopping the data merge operation refers to ending the current data merge operation being performed. After stopping one data merge operation, if the total number of PUs belonging to the spare region 602 is less than or equal to the first threshold value again, then a next data merge operation may be executed again in attempting to release new spare PUs.

Figure 7:
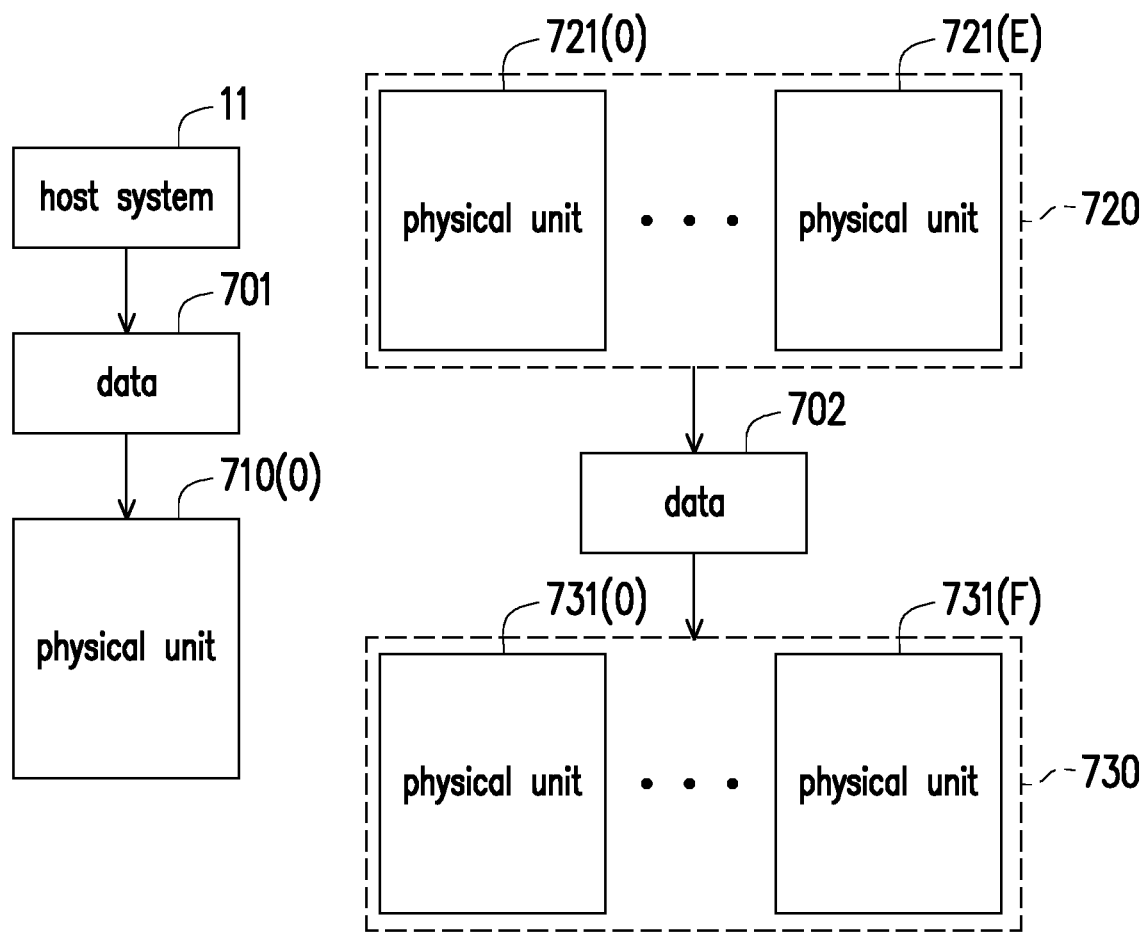
FIG. 7 is a schematic diagram of a host write operation and a data merge operation according to an exemplary embodiment of the disclosure.

FIG. 7 is a schematic diagram of a host write operation and a data merge operation according to an exemplary embodiment of the disclosure.

Please refer to FIG. 7, in a host write operation, the host system 11 sends at least one write command instructing to write data 701 (also referred to as a first data) to a certain LU (also referred to as a first LU). According to the write command, the data 701 is stored to a PU 710(0) (also referred to as a first PU) mapped to a first LU. For example, the PU 710(0) may be selected from the spare region 602 of FIG. 6. In an exemplary embodiment, the PU 710(0) currently used to store the data 701 from the host system 11 is also referred to as an open block or a host write block. It shall be noted that, in another embodiment, the open block or the host write block may also contain multiple PUs.

During the time period for performing the host write operation, a data merge operation may be performed. Alternatively, during the time period for performing the data merge operation, the host write operation may be performed. In the data merge operation, data 702 (also referred to as a second data) belonging to at least one LU (also referred to as a second LU) may be collected from PUs 721(0)-721(E) (also referred to as second PUs) belonging to a source node 720 and written to PUs 731(0)-731(F) (also referred to as third PUs) belonging to a recycling node 730. The data 702 includes valid data, and the second LU may be mapped to the PUs 731(0)-731(F). The PUs 721(0)-721(E) belonging to the source node 720 are selected from the storage region 601 of FIG. 6 while the PUs 731(0)-731(F) belonging to the recycling node 730 are selected from the spare region 602 of FIG. 6. In an exemplary embodiment, the PUs 721(0)-721(E) are E+1 PUs storing the least valid data in the storage region 601 of FIG. 6. In an exemplary embodiment, the PUs 721(0)-721(E) are selected from the storage region 601 of FIG. 6 according to other rules, and the disclosure is not limited thereto.

Figure 8:
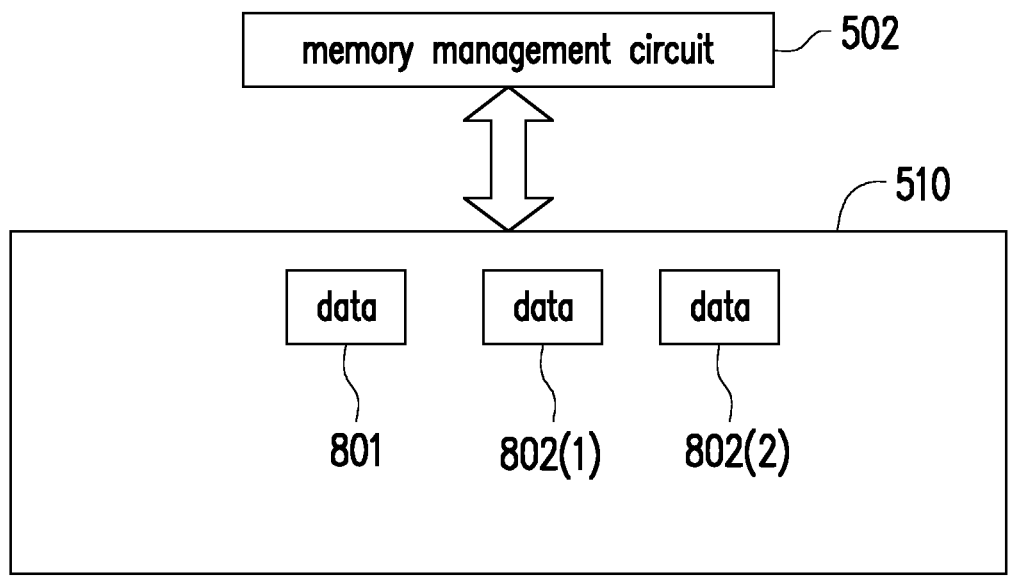
FIG. 8 is a schematic diagram of recording updating data according to an exemplary embodiment of the disclosure.

FIG. 8 is a schematic diagram of recording updating data according to an exemplary embodiment of the disclosure.

Please refer to FIG. 7 and FIG. 8, the MMC 502 may record data 801 to the buffer memory 510 according to a performed host write operation. The data 801 includes mapping information related to a LU (i.e., the first LU) to which the data 701 belongs. For example, the data 801 may include a P2L table, corresponding to the data 701, which reflects the mapping relationship between the PU 710(0) and the first LU. According to the performed data merge operation, the MMC 502 may record data 802(1) and 802(2) to the buffer memory 510. The data 802(1) and 802(2) include the mapping information related to a LU (i.e., the second LU) to which the data 702 belongs. For example, the data 802(1) and 802(2) may include a P2L table, corresponding to the data 702, which reflects the mapping relationship between the PU 731(0) and the second LU.

Figure 9:
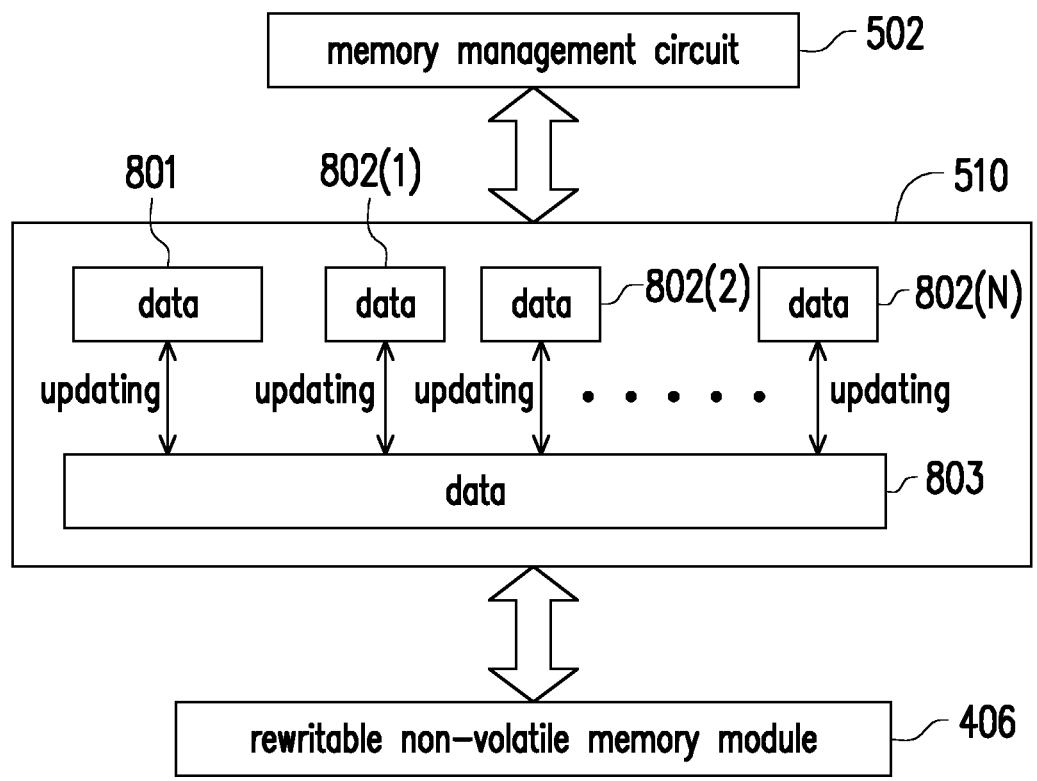
FIG. 9 is a schematic diagram of recording updating data and updating a management information according to an exemplary embodiment of the disclosure.

FIG. 9 is a schematic diagram of recording updating data and updating management information according to an exemplary embodiment of the disclosure.

Please refer to FIG. 7 to FIG. 9, according to the continuously performed host write operation in the exemplary embodiment of FIG. 7, the MMC 502 may continuously store the data 801 to the buffer memory 510, and the data amount of the data 801 increases gradually. In addition, according to the continuously performed data merge operation in the exemplary embodiment of FIG. 7, the MMC 502 may continuously store data 802(1)-802(N) to the buffer memory 510, and the data amount of the data 802(1)-802(N) is greater than the data amount of the data 802(1) and 802(2) in the exemplary embodiment of FIG. 8. For example, the data 802(1) and 802(2) may reflect a part of the data in the data 702 to be stored to the PU 731(0) while the data 802(N) may reflect another part of the data in the data 702 to be stored to the PU 731(F).

After a certain time point (also referred to as a first time point), the MMC 502 may instruct to read the data 803 from the RNVM module 406 to the buffer memory 510 according to the data 801 and 802(1)-802(N). For example, the data 803 may include the management information stored in the system region 603 of FIG. 6. Then, the MMC 502 may update the data 803 in the buffer memory 510 according to the data 801 and 802(1) to 802(N). For example, the MMC 502 may update the L2P information recorded in the L2P table in the system region 603 of FIG. 6 according to the P2L table of the data 801 and 802(1)-802(N). The updated data 803 may reflect the mapping relationship between the PU 710(0) and the first LU to which the data 701 belongs and the mapping relationship between the PUs 731(0)-731(F) and the second LU to which the data 702 belongs in the exemplary embodiment of FIG. 7.

The MMC 502 may instruct to store the updated data 803 to the RNVM module 406 (e.g., the system region 603 of FIG. 6) and clear the data 801 and 802(1)-802(N) in the buffer memory 510. After storing the updated data 803 to the RNVM module 406, the MMC 502 may access the data (i.e., the data 701 and 702) stored by the PU 710(0) and 731(0)-731(F) according to the updated data 803 (i.e., the updated management information in the RNVM module 406).

From another point of view, in the exemplary embodiment of FIG. 8, before the first time point, the MMC 502 continuously stores the data 801, 802(1), and 802(2) in the buffer memory 510 and does not read the management information (e.g., the data 803) from the RNVM module 406 according to the data 801, 802(1), and 802(2). In an exemplary embodiment of FIG. 8, before the first time point, the MMC 502 may prohibit reading of the management information (e.g., the data 803) according to any one of the data 801, 802(1), and 802(2).

In an exemplary embodiment of FIG. 8, if the management information is read from the RNVM module 406 and updated according to only the data 802(1) and/or 802(2), then each read of the management information may cause wear to the RNVM module 406 or the memory cells storing the management information. However, in the exemplary embodiment of FIG. 9, the relevant management information (i.e., the data 803) is read from the RNVM module 406 at once and updated in the buffer memory 510 according to the data 801 and 802(1)-802(N) after the first time point, so the number of accesses to the RNVM module 406 may be effectively reduced, thereby extending the life span of the RNVM module 406.

In an exemplary embodiment, the MMC 502 may determine whether the data 801 in the buffer memory 510 meets a preset condition. Taking FIG. 8 as an example, if the data 801 in the buffer memory 510 does not meet the preset condition, the MMC 502 may continuously store the data 801, 802(1), and 802(2) in the buffer memory 510 and does not read the management information (e.g., the data 803) from the RNVM module 406 according to the data. 801, 802(1), and/or 802(2). Alternatively, taking FIG. 9 as an example, if the data 801 in the buffer memory 510 meets the preset condition, the MMC 502 may instruct to read the data 803 from the RNVM module 406 to the buffer memory 510 at once and update the data 803 according to the data 801 and 802(1)-802(N). In other words, the MMC 502 may read and update the data 803 in response to that the data 801 in the buffer memory 510 meets the preset condition. In addition, the first time point may be any time point after the MMC 502 determines that the data 801 in the buffer memory 510 meets the preset condition.

In an exemplary embodiment, the MMC 502 may determine whether the data amount of the data 801 in the buffer memory 510 is not less than (i.e., equal to or greater than) a preset data amount. If the data amount of the data 801 in the buffer memory 510 is less than the preset data amount, the MMC 502 may determine that the data 801 does not meet the preset condition. On the other hand, if the data amount of the data 801 in the buffer memory 510 is not less than the preset data amount, the MMC 502 may determine that the data 801 meets the preset condition. In other words, the MMC 502 may determine that the data 801 meets the preset condition and thereby reading and updating the data 803 in response to the data amount of the data 801 in the buffer memory 510 being not less than the preset data amount.

In an exemplary embodiment, the MMC 502 may determine whether the data 801 and the data 802(1) to 802(N) in the buffer memory 510 record the mapping information related to the same LU (also referred to as the sub-updating data corresponding to the same LU). If the data 801 and the data 802(1)-802(N) in the buffer memory 510 record the mapping information related to the same LU, the MMC 502 may cause at least part of the data 802(1)-802(N) to be invalid. For example, assuming that both of the data 801 and the data 802(1) include the mapping information related to the LU 612(0) of FIG. 6, then the MMC 502 may maintain the mapping information related to the LU 612(0) in the data 801 and cause the mapping information related to the LU 612(0) in the data 802(1) to be invalid. In addition, the MMC 502 may also delete or ignore the same information of at least part of the data 802(1)-802(N). As such, the overall data amount of the data 801 and 802(1)-802(N) may be reduced, and repeatedly updating the data 803 according to the same information may be prevented.

In an exemplary embodiment, the MMC 502 may obtain the mapping information related to the same LU in the data 801 and 802(1)-802(N) in the buffer memory 510 (i.e., the sub-updating data corresponding to the same LU). Then, the MMC 502 may read and update the data 803 according to the newest data in the sub-updating data. For example, the MMC 502 may compare the data 801 with at least one of the data 802(1)-802(N) in the buffer memory 510 or compare all of the data 801 and 802(1)-802(N) in the buffer memory 510 to determine whether the data 801 and 802(1)-802(N) in buffer memory 510 contain the mapping information related to the same LU. Assuming that both of the data 801 and 802(1) contain the mapping information related to the LU 612(0) of FIG. 6, then the MMC 502 may determine whether the data 801 is newer or the data 802(1) is newer. If the data 801 is newer than the data 802(1), the MMC 502 may update the mapping information related to the LU 612(0) in the data 803 according to only the data 801. Alternatively, if the data 802(1) is newer than the data 801, the MMC 502 may update the mapping information related to the LU 612(0) in the data 803 according to only the data 802(1).

In an exemplary embodiment, the MMC 502 may determine whether first updating data and/or second updating data exist in the buffer memory 510. The first updating data includes the updating data generated based on one of the host write operation and the data merge operation. The second updating data includes the updating data generated based on the other one of the host write operation and the data merge operation. For example, the updating data generated based on the host write operation includes the data 801 while the updating data generated based on the data merge operation includes the data 802(1)-802(N).

In an exemplary embodiment, if one of the first updating data and the second updating data exists in the buffer memory 510 (i.e., one of the first updating data and the second updating data is temporarily stored in the buffer memory 510), the MMC 502 may determine whether the other one of the first updating data and the second updating data exists in the buffer memory 510. In an exemplary embodiment, if only one of the first updating data and the second updating data exists in the buffer memory 510 (e.g., only the data 801 or the 802(1) exists), then the MMC 502 may not read and update the management information according to the one of the first updating data and the second updating data. For example, the MMC 502 may maintain the one of the first updating data and the second updating data in the buffer memory 510 continuously. In an exemplary embodiment, if the first updating data and the second updating data exist in the buffer memory 510 simultaneously, the MMC 502 may read and update the management information (e.g., the data 803) according to the first updating data and the second updating data. Refer to the exemplary embodiment of FIG. 9 for details of relevant operations.

Figure 10:
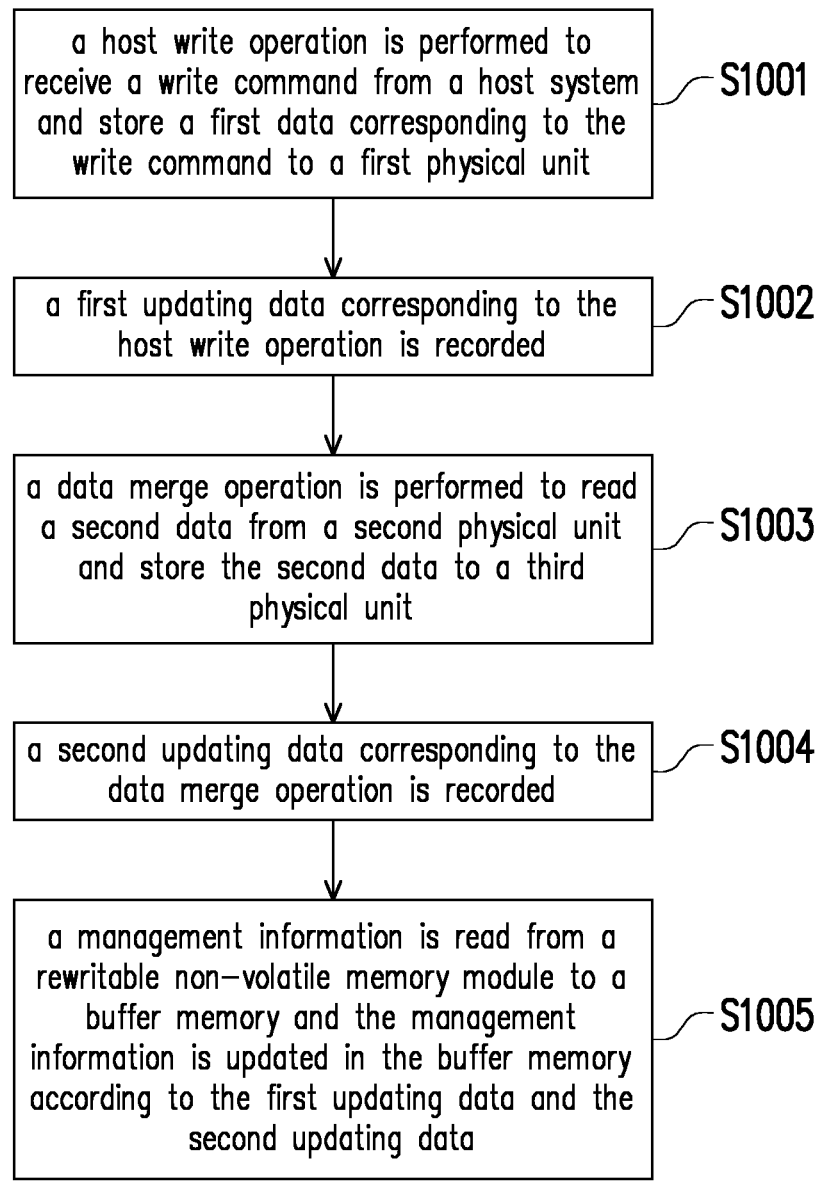
FIG. 10 is a flow chart of a memory management method according to an exemplary embodiment of the disclosure.

FIG. 10 is a flow chart of a memory management method according to an exemplary embodiment of the disclosure.

Please refer to FIG. 10, in Step S1001, a host write operation is performed to receive a write command from a host system and store first data corresponding to the write command to a first PU. In Step S1002, first updating data corresponding to the host write operation is recorded. In Step S1003, a data merge operation is performed to read second data from a second PU and store the second data to a third PU. In Step S1004, second updating data corresponding to the data merge operation is recorded. In Step S1005, management information is read from a RNVM module to a buffer memory and the management information is updated in the buffer memory according to the first updating data and the second updating data.

Figure 11:
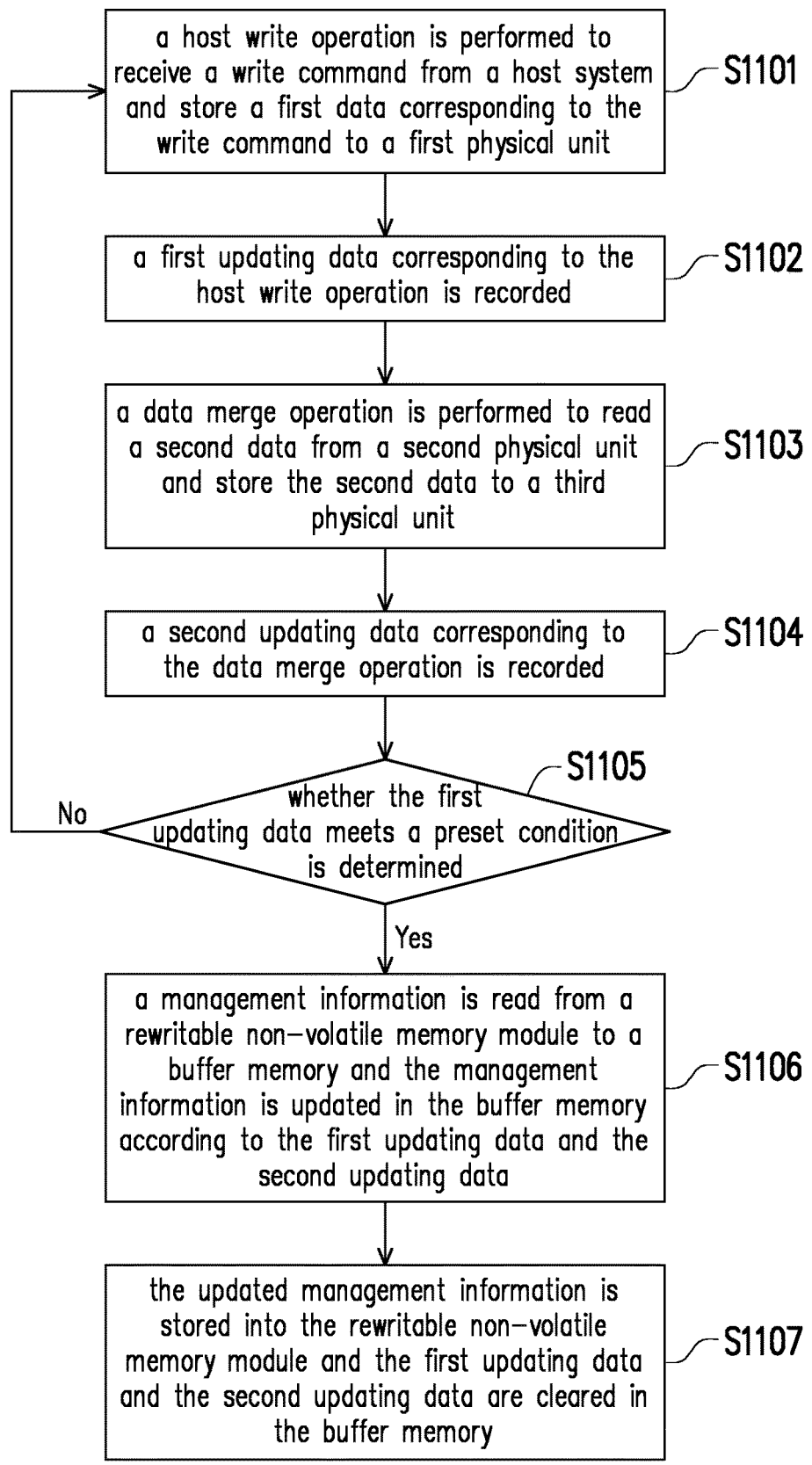
FIG. 11 is a flow chart of a memory management method according to an exemplary embodiment of the disclosure.

FIG. 11 is a flow chart of a memory management method according to an exemplary embodiment of the disclosure.

Please refer to FIG. 11, in Step S1101, a host write operation is performed to receive a write command from a host system and store first data corresponding to the write command to a first PU. In step S1102, first updating data corresponding to the host write operation is recorded. In Step S1103, a data merge operation is performed to read second data from a second PU and store the second data to a third PU. In Step S1104, second updating data corresponding to the data merge operation is recorded. In Step S1105, whether the first updating data meets a preset condition is determined. If the first updating data meets the preset condition, in Step S1106, management information is read from a RNVM module to a buffer memory and the management information is updated in the buffer memory according to the first updating data and the second updating data. In Step S1107, the updated management information is stored to the RNVM module and the first updating data and the second updating data are cleared in the buffer memory. Furthermore, if the determination in Step S1105 is negative, then Steps S1101 to S1104 may be performed repeatedly.

It shall be noted that the disclosure is not limited to the order of performing Steps S1001 to S1004 in FIG. 10 and Steps S1101 to S1104 in FIG. 11. For example, in another embodiment of FIG. 10, Steps S1003 and S1004 may be performed before Steps S1001 and S1002 or be performed simultaneously with Steps S1001 and S1002, and/or in another embodiment of FIG. 11, Steps S1103 and S1104 may be performed before Steps S1101 and S1102 or be performed simultaneously with Steps S1101 and S1102.

Figure 12:
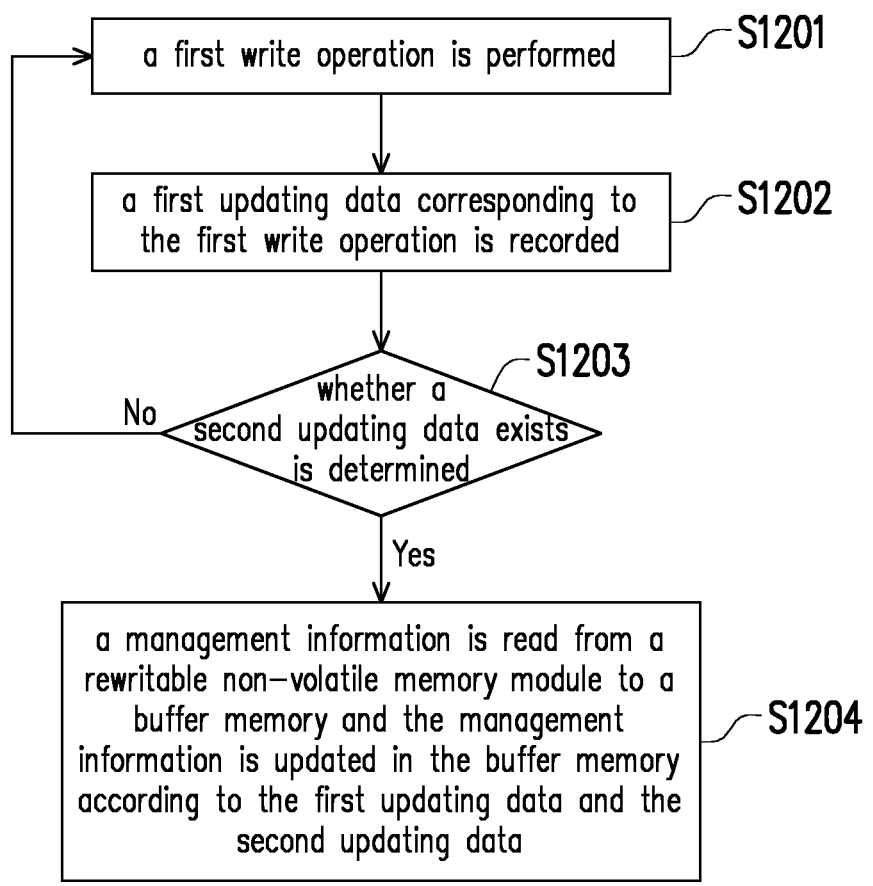
FIG. 12 is a flow chart of a memory management method according to an exemplary embodiment of the disclosure.

FIG. 12 is a flow chart of a memory management method according to an exemplary embodiment of the disclosure.

Please refer to FIG. 12, in Step S1201, a first write operation is performed. The first write operation includes one of the operation of storing first data received from a host system to a first PU (i.e., the host write operation) and the operation of writing second data stored in a second PU to a third PU (i.e., the data merge operation). In Step S1202, first updating data corresponding to the first write operation is recorded. For example, the first updating data is generated based on the first write operation and may be temporarily stored in a buffer memory. In Step S1203, whether second updating data exists is determined. The second updating data is generated based on a second write operation and may be temporarily stored in the buffer memory. The first write operation is different from the second write operation. For example, the second write operation includes the other one of the operation of storing the first data received from the host system to the first PU (i.e., the host write operation) and the operation of writing the second data stored in the second PU to the third PU (i.e., the data merge operation). For example, in an exemplary embodiment, the first write operation may be the host write operation while the second write operation is the data merge operation. Alternatively, in an exemplary embodiment, the first write operation may be the data merge operation while the second write operation is the host write operation.

If the second updating data exists, in Step S1204, management information is read from a RNVM module to a buffer memory and the management information is updated in the buffer memory according to the first updating data and the second updating data. However, if the second updating data does not exit, for example, the first updating data exists but the second updating data does not exist in the buffer memory, then the process may return to Step S1201 to continue performing the first write operation and/or the second write operation.

However, the steps in FIG. 10 to FIG. 12 have been described in detail above and may not be reiterated here. It shall be noted that the steps in FIG. 10 to FIG. 12 may be implemented as multiple program codes or circuits, and the disclosure is not limited thereto. In addition, the methods of FIG. 10 to FIG. 12 may be used in combination with the embodiments above or may be used alone, and the disclosure is not limited thereto.

Based on the above, the first updating data and the second updating data may be recorded respectively corresponding to the performed host write operation and the performed data merge operation. After the first time point, according to the first updating data and the second updating data, the management information may be read from the RNVM module to the buffer memory and updated in the buffer memory. In an exemplary embodiment, the management information is read to the buffer memory for updating only when the management information needs to be updated according to the first updating data (e.g., when the first updating data meets the preset condition). In an exemplary embodiment, if the buffer memory has the second updating data but the first updating data does not meet the preset condition, then the management information may not be read into the buffer memory for updating. In an exemplary embodiment, the management information is read into the buffer memory for updating only when the first updating data and the second updating data both exist in the buffer memory. As such, the number of accesses to the RNVM module may be effectively reduced, thereby extending the life span of the RNVM module.

The previously described exemplary embodiments of the present disclosure have the advantages aforementioned, wherein the advantages aforementioned not required in all versions of the disclosure.

It may be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory management method, for a rewritable non-volatile memory module, wherein the rewritable non-volatile memory module comprises a plurality of physical units, the memory management method comprising:
performing a host write operation, so as to receive a write command from a host system and store first data corresponding to the write command to a first physical unit among the physical units;
recording first updating data corresponding to the host write operation, wherein the first updating data comprises first mapping information which reflects an executing result of the host write operation;
performing a data merge operation, so as to read second data from a second physical unit among the physical units and store the second data to a third physical unit among the physical units;
recording second updating data corresponding to the data merge operation, wherein the second updating data comprises second mapping information which reflects an executing result of the data merge operation;
temporarily prohibiting a reading of management information from the rewritable non-volatile memory module to a buffer memory responsive to the first updating data and the second updating data not existing in the buffer memory simultaneously;
reading the management information from the rewritable non-volatile memory module to the buffer memory responsive to the first updating data and the second updating data existing in the buffer memory simultaneously; and
updating the management information in the buffer memory according to the first updating data and the second updating data in the buffer memory.

2. The memory management method according to claim 1, wherein a step of reading the management information from the rewritable non-volatile memory module to the buffer memory if the first updating data and the second updating data exist in the buffer memory simultaneously, and updating the management information in the buffer memory according to the first updating data and the second updating data in the buffer memory comprise:
reading the management information from the rewritable non-volatile memory module to the buffer memory and updating the management information in the buffer memory according to the first updating data and the second updating data in the buffer memory in response to that the recorded first updating data meets a preset condition.

3. The memory management method according to claim 2, further comprising:
determining that the recorded first updating data meets the preset condition in response to that a data amount of the recorded first updating data is not less than a preset data amount.

4. The memory management method according to claim 1, further comprising:
storing the second updating data in the buffer memory continuously and not reading the management information according to the second updating data before the management information is read to the buffer memory.

5. The memory management method according to claim 1, wherein the first mapping information related to a first logical unit, the second related to a second logical unit, the first logical unit is mapped to the first physical unit, and the second logical unit is mapped to the third physical unit.

6. The memory management method according to claim 1, wherein a step of reading the management information from the rewritable non-volatile memory module to the buffer memory if the first updating data and the second updating data exist in the buffer memory simultaneously, and updating the management information in the buffer memory according to the first updating data and the second updating data in the buffer memory comprise:
updating logical-to-physical mapping information according to the first updating data and the second updating data in the buffer memory.

7. The memory management method according to claim 1, further comprising:
storing the updated management information to the rewritable non-volatile memory module; and
clearing the first updating data and the second updating data in the buffer memory.

8. The memory management method according to claim 1, further comprising:
obtaining sub-updating data in both of the first updating data and the second updating data corresponding to one specific logical unit; and
updating the management information according to newest data in the sub-updating data.

9. The memory management method according to claim 1, further comprising:
determining whether at least one of the first updating data and the second updating data exists in the buffer memory.

10. A memory storage device comprising:
a connection interface unit, configured to be coupled to a host system;
a rewritable non-volatile memory module comprising a plurality of physical units; and
a memory control circuit unit, coupled to the connection interface unit and the rewritable non-volatile memory module, wherein
the memory control circuit unit is configured to perform a host write operation, so as to receive write command from the host system and instruct a storing of first data corresponding to the write command to a first physical unit among the physical units,
the memory control circuit unit is further configured to record first updating data corresponding to the host write operation, wherein the first updating data comprises first mapping information which reflects an executing result of the host write operation,
the memory control circuit unit is further configured to perform a data merge operation, so as to instruct a reading of second data from a second physical unit among the physical units and a storing of the second data to a third physical unit among the physical units, the memory control circuit unit is further configured to record second updating data corresponding to the data merge operation, wherein the second updating data comprises second mapping information which reflects an executing result of the data merge operation, the memory control circuit unit is further configured to temporarily prohibit a reading of management information from the rewritable non-volatile memory module to a buffer memory responsive to the first updating data and the second updating data not existing in the buffer memory simultaneously, and the memory control circuit unit is further configured to instruct the reading of the management information from the rewritable non-volatile memory module to the buffer memory responsive to the first updating data and the second updating data existing in the buffer memory simultaneously, and update the management information in the buffer memory according to the first updating data and the second updating data in the buffer memory.

11. The memory storage device according to claim 10, wherein an operation of reading the management information from the rewritable non-volatile memory module to the buffer memory if the first updating data and the second updating data exist in the buffer memory simultaneously, and updating the management information in the buffer memory according to the first updating data and the second updating data in the buffer memory by the memory control circuit unit comprise:

reading the management information from the rewritable non-volatile memory module to the buffer memory and updating the management information in the buffer memory according to the first updating data and the second updating data in the buffer memory in response to that the recorded first updating data meets a preset condition.

12. The memory storage device according to claim 11, wherein the memory control circuit unit is further configured to determine that the recorded first updating data meets the preset condition in response to that a data amount of the first updating data is not less than a preset data amount.

13. The memory storage device according to claim 10, wherein the memory control circuit unit is further configured to continuously store the second updating data in the buffer memory and not read the management information according to the second updating data before the management information is read to the buffer memory.

14. The memory storage device according to claim 10, wherein the first mapping information related to a first logical unit, the second mapping information related to a second logical unit, the first logical unit is mapped to the first physical unit, and the second logical unit is mapped to the third physical unit.

15. The memory storage device according to claim 10, wherein an operation of reading the management information from the rewritable non-volatile memory module to the buffer memory if the first updating data and the second updating data exist in the buffer memory simultaneously, and updating the management information in the buffer memory according to the first updating data and the second updating data in the buffer memory by the memory control circuit unit comprise:

updating logical-to-physical mapping information according to the first updating data and the second updating data in the buffer memory.

16. The memory storage device according to claim 10, wherein the memory control circuit unit is further configured to store the updated management information to the rewritable non-volatile memory module, and the memory control circuit unit is further configured to clear the first updating data and the second updating data in the buffer memory.

17. The memory storage device according to claim 10, wherein the memory control circuit unit is further configured to obtain sub-updating data in both of the first updating data and the second updating data corresponding to one specific logical unit, and the memory control circuit unit is further configured to update the management information according to newest data in the sub-updating data.

18. A memory control circuit unit, for controlling a rewritable non-volatile memory module which comprises a plurality of physical units, and the memory control circuit unit comprising:

a host interface configured to be coupled to a host system;

a memory interface configured to be coupled to the rewritable non-volatile memory module;

a buffer memory; and a memory management circuit coupled to the host interface, the memory interface, and the buffer memory, wherein the memory management circuit is configured to perform a host write operation, so as to receive a write command from the host system and instruct a storing of first data corresponding to the write command to a first physical unit among the physical units, the memory management circuit is further configured to record first updating data corresponding to the host write operation, wherein the first updating data comprises first mapping information which reflects an executing result of the host write operation, the memory management circuit is further configured to perform a data merge operation, so as to instruct a reading of second data from a second physical unit among the physical units and a storing of the second data to a third physical unit among the physical units, the memory management circuit is further configured to record second updating data corresponding to the data merge operation, wherein the second updating data comprises second mapping information which reflects an executing result of the data merge operation, the memory management circuit is further configured to temporarily prohibit a reading of management information from the rewritable non-volatile memory module to the buffer memory responsive to the first updating data and the second updating data not existing in the buffer memory simultaneously, and the memory management circuit is further configured to instruct the reading of the management information from the rewritable non-volatile memory module to the buffer memory responsive to the first updating data and the second updating data existing in the buffer memory simultaneously, and update the management information in the buffer memory according to the first updating data and the second updating data in the buffer memory.

19. The memory control circuit unit according to claim 18, wherein an operation of reading the management information from the rewritable non-volatile memory module to the buffer memory if the first updating data and the second updating data exist in the buffer memory simultaneously, and updating the management information in the buffer memory according to the first updating data and the second updating data in the buffer memory by the memory management circuit comprise:

reading the management information from the rewritable non-volatile memory module to the buffer memory and updating the management information in the buffer memory according to the first updating data and the second updating data in the buffer memory in response to that the recorded first updating data meets to a preset condition.

20. The memory control circuit unit according to claim 19, wherein the memory management circuit is further configured to determine that the recorded first updating data meets the preset condition in response to that a data amount of the first data recorded is not less than a preset data amount.

21. The memory control circuit unit according to claim 18, wherein the memory management circuit is further configured to continuously store the second updating data in the buffer memory and not read the management information according to the second updating data before the management information is read to the buffer memory.

22. The memory control circuit unit according to claim 18, wherein the first mapping information related to a first logical unit, the second mapping information related to a second logical unit, the first logical unit is mapped to the first physical unit, and the second logical unit is mapped to the third physical unit.

23. The memory control circuit unit according to claim 18, wherein an operation of reading the management information from the rewritable non-volatile memory module to the buffer memory if the first updating data and the second updating data exist in the buffer memory simultaneously, and updating the management information in the buffer memory according to the first updating data and the second updating data in the buffer memory by the memory management circuit comprise:

updating logical-to-physical mapping information according to the first updating data and the second updating data in the buffer memory.

24. The memory control circuit unit according to claim 18, wherein the memory management circuit is further configured to store the updated management information to the rewritable non-volatile memory module, and the memory management circuit is further configured to clear the first updating data and the second updating data in the buffer memory.

25. The memory control circuit unit according to claim 18, wherein the memory management circuit is further configured to obtain sub-updating data in both of the first updating data and the second updating data corresponding to a specific logical unit, and the memory management circuit is further configured to update the management information according to a newest data in the sub-updating data.

26. The memory control circuit unit according to claim 18, wherein the memory management circuit is further configured to determine whether at least one of the first updating data and the second updating data exists in the buffer memory.

27. A memory storage device comprising:
a connection interface unit configured to be coupled to a host system;
a rewritable non-volatile memory module comprising a plurality of physical units; and
a memory control circuit unit coupled to the connection interface unit and the rewritable non-volatile memory module, wherein
the memory control circuit unit is configured to perform a first write operation, the first write operation comprises one of an operation of storing first data received from the host system to a first physical unit among the physical units and an operation of writing second data stored in a second physical unit among the physical units to a third physical unit among the physical units,
the memory control circuit unit is further configured to record first updating data corresponding to the first write operation, wherein the first updating data comprises first mapping information which reflects an executing result of the first write operation,
the memory control circuit unit is further configured to determine whether second updating data exists, the second updating data is generated based on a second write operation, and the second write operation comprises the other operation of the operation of storing the first data to the first physical unit and the operation of writing the second data to the third physical unit, wherein the second updating data comprises second mapping information which reflects an executing result of the second write operation,
the memory control circuit unit is further configured to temporarily prohibit a reading of management information from the rewritable non-volatile memory module to a buffer memory responsive to the first updating data and the second updating data not existing in the buffer memory simultaneously, and
the memory control circuit unit is further configured to instruct the reading of the management information from the rewritable non-volatile memory module to the buffer memory responsive to the first updating data and the second updating data existing in the buffer memory simultaneously, and update the management information in the buffer memory according to the first updating data and the second updating data in the buffer memory.

* * * * *